(No Model.)
C. LEDUC.
FIRE KINDLER.
No. 308,178. Patented Nov. 18, 1884.
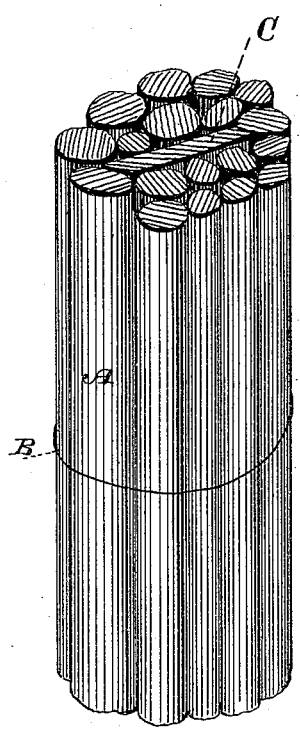
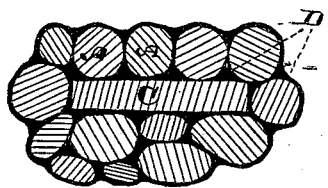
Witnesses,
Geo. H. Strong.
J. A. Nourse
Inventor,
C. Leduc
By
Dewey & Co.
Attorneys

UNITED STATES PATENT OFFICE.

CONSTANT LEDUC, OF SAN FRANCISCO, CALIFORNIA.

FIRE-KINDLER.

SPECIFICATION forming part of Letters Patent No. 308,178, dated November 18, 1884.

Application filed January 21, 1884. (No model.)

*To all whom it may concern:*

Be it known that I, CONSTANT LEDUC, of the city and county of San Francisco, and State of California, have invented an Improvement in Fire-Kindlers; and I hereby declare the following to be a full, clear, and exact description thereof.

My invention relates to a new and useful fire-kindler; and it consists of a bunch made of the stems or stalks of the tule grass, with or without a core of wood, said bunch being coated with and its interstices permeated by some inflammable substance—such as rosin—as I shall hereinafter fully describe.

The object of my invention is to provide a cheap and light package or bunch of a highly-inflammable material or substance, which may be used in kindling fires to an advantage.

Referring to the accompanying drawings, Figure 1 is a perspective view of my fire-kindler as bunched. Fig. 2 is a top view showing the coating of rosin or other inflammable material.

The bunch or package is made of short pieces A of the stems or stalks of the tule grass, the nature of which I shall presently explain. These are laid parallel with each other, and are formed into and secured in a kind of cylindrical shape by means of an encircling band, B, preferably of light wire. The bunch, when formed, is treated with some inflammable substance—such as rosin—represented by D in Fig. 2, which is accomplished by dipping when the rosin is in a melted condition. The bunch thus becomes coated and all its interstices filled with the rosin, which subsequently hardens and sticks to the stems. The tule, which forms the basis of the kindler, being itself highly inflammable when dry, and very light of body, is apt to burn up too rapidly, and therefore I put into the bunch a core of wood, C, which is readily ignited by the tule and serves to prolong combustion. It also stiffens the bunch and renders it more compact. The tule grass is scientifically known as the "*Scirpus validus*," and belongs to the order of *Cyperaceæ*. It is a club-rush or sedge, and grows abundantly and to great dimensions in California. Its stems are very pithy, with a loose fiber, and when dry it is readily burned and can be ignited easily. The diameter of its stems renders it peculiarly adapted for the use herein, as a few of them can be handled readily, and make a bunch sufficiently large and compact. Its abundance is an advantage in economy, and the growing industries which have this rush for a basis will form a source of supply for the fire-kindler use by reason of the waste, which would otherwise be of no value.

I am aware that a fire-kindler has been made in which an ingredient or a part consisted of straw and various dried grasses; and I therefore lay no claim to such, but confine myself to the fire-kindler I have described as a new article of manufacture, which possesses advantages peculiar to itself.

Having thus described my invention, what I claim as new, and desire to secure by Letters Patent, is—

As an improved article of manufacture, a fire-kindler consisting of stems or stalks of tule coated and its interstices filled with some inflammable substance—such as rosin—and a wooden core around which the said stalks or stems are tied, substantially as herein described.

In witness whereof I have hereunto set my hand.

CONSTANT LEDUC.

Witnesses:
C. D. COLE,
J. H. BLOOD.